US008104603B2

United States Patent
Martinelli

(10) Patent No.: US 8,104,603 B2
(45) Date of Patent: Jan. 31, 2012

(54) STARWHEEL CONVEYING DEVICE INCLUDING A WHEEL VERTICAL ADJUSTMENT DEVICE

(75) Inventor: Marco Martinelli, Octeville sur Mer (FR)

(73) Assignee: Sidel Participations, Octeville sur Mer (FR)

(*) Notice: Subject to any disclaimer, the term of this patent is extended or adjusted under 35 U.S.C. 154(b) by 190 days.

(21) Appl. No.: 12/596,614

(22) PCT Filed: Apr. 20, 2007

(86) PCT No.: PCT/IB2007/002298
§ 371 (c)(1),
(2), (4) Date: Jan. 22, 2010

(87) PCT Pub. No.: WO2008/129347
PCT Pub. Date: Oct. 30, 2008

(65) Prior Publication Data
US 2010/0133067 A1    Jun. 3, 2010

(51) Int. Cl.
*B65G 47/84* (2006.01)
*B65G 47/86* (2006.01)
(52) U.S. Cl. .................. 198/459.2; 198/470.1
(58) Field of Classification Search ............ 198/377.01, 198/377.03, 459.2, 441, 470.1
See application file for complete search history.

(56) References Cited

U.S. PATENT DOCUMENTS

| 3,975,260 A | 8/1976 | Peyton et al. |
| 5,558,200 A * | 9/1996 | Whitby et al. ............. 198/470.1 |
| 5,590,753 A | 1/1997 | Bertschi et al. |
| 5,683,729 A | 11/1997 | Valles |
| 5,711,411 A * | 1/1998 | Zurweller ................ 198/470.1 |
| 5,743,377 A * | 4/1998 | Kronseder ................ 198/803.9 |
| 5,784,857 A | 7/1998 | Ford et al. |
| 6,354,427 B1 * | 3/2002 | Pickel et al. ............ 198/470.1 |
| 6,520,318 B1 | 2/2003 | Humele |
| 2004/0065525 A1 * | 4/2004 | Bonatti et al. ........... 198/377.07 |
| 2010/0200367 A1 * | 8/2010 | Nguyen et al. ........... 198/470.1 |
| 2010/0294622 A1 * | 11/2010 | Graffin ................... 198/470.1 |

FOREIGN PATENT DOCUMENTS

| GB | 528265 A | 10/1940 |
| GB | 2149740 A | 6/1985 |

* cited by examiner

*Primary Examiner* — Mark A Deuble
(74) *Attorney, Agent, or Firm* — Sughrue Mion, PLLC

(57) ABSTRACT

An article conveying device (1) comprising a star wheel (2) having a plurality of gripping devices (3) mounted on the circumference thereof, a rotary drive shaft (8), a hub (10) coupling the wheel (2) to the drive shaft (8), said conveying device (1) being characterized in that it comprises adjustable fastening devices (22) for coupling the star wheel (2) to the hub (10), each fastening device (22) comprising a drift bolt (23) including a body (24) having a threaded portion (25) screwed into a hole (26) provided in the hub (10), said body (24) protruding from an upper face (28) of the hub (10), a head (34) protruding from a lower face (31) of the hub (10), a central bore (30), a washer (36) interposed between the head (34) of the drift bolt (23) and the lower face (31) of the hub (10), said washer (36) having a predetermined thickness (T3), whereby the starwheel (2) rests on an upper face (40) of the drift bolt (23) with a predetermined clearance (C) with respect of the hub (10), a bolt (37) mounted in the bore (30), said bolt (37) having a threaded portion (38) protruding from the drift bolt (23) and screwed into a hole (39) provided in the wheel (2), thereby fastening the wheel (2) to the hub (10).

5 Claims, 4 Drawing Sheets

STARWHEEL CONVEYING DEVICE INCLUDING A WHEEL VERTICAL ADJUSTMENT DEVICE

CROSS REFERENCE TO RELATED APPLICATION

This application is a National Stage of International Application No. PCT/IB2007/002298 filed Apr. 20, 2007, the contents of all of which are incorporated herein by reference in their entirety.

FIELD OF THE INVENTION

The invention relates to the article conveying industry, and more specifically to the container manufacturing/filling industry.

BACKGROUND OF THE INVENTION

In the container manufacturing/filling industry, containers are often transferred at high speed rates from a first station, where a first operation (such as molding) is performed, to a second station, where a second operation (such as filling) is performed.

A container handling machine is generally provided with a plurality of adjacent conveying devices including at least one rotary starwheel conveying device provided with a plurality of container gripping elements for loading/unloading containers, see e.g. U.S. Pat. No. 5,683,729 (Valles) and U.S. Pat. No. 6,520,318 (Humele).

Considering the high speed rates (up to several tens of thousands of containers per hour), it is critical that the adjacent conveying devices be properly and precisely positioned with respect to each other. Otherwise, containers may be improperly loaded on the conveying devices, resulting in container-jamming and machine stop. Vertical positioning is one of the most critical issue.

In existing handling machine, conveying devices are generally adjusted in vertical position by moving the entire device with respect of a machine foundation. Considering the weight of one single conveying device (up to a ton), such a solution is time and effort consuming. Moreover, adjustment is not precise enough for the required purpose. In an alternate solution, vertical positioning may be achieved through peelable shims which can be added—or removed—between the wheel and a supporting hub. Such a solution unquestionably allows for precise vertical adjustment. However, since the wheel needs to be removed from its hub, it is also time and effort consuming.

SUMMARY OF THE INVENTION

It is therefore an object of the invention to provide an article conveying device, the vertical position of which can be easily adjusted.

It is another object of the invention to provide an article conveying device, the vertical position of which can be rapidly adjusted.

It is another object of the invention to provide an article conveying device, the vertical position of which can be precisely adjusted.

The proposed article conveying device comprises:
a star wheel having a plurality of gripping devices mounted on the circumference thereof,
a rotary drive shaft,
a hub coupling the wheel to the drive shaft,
adjustable fastening devices for coupling the star wheel to the hub, each fastening device comprising:
a drift bolt including:
a body having a threaded portion screwed into a hole provided in the hub, said body protruding from an upper face of the hub,
a head protruding from a lower face of the hub,
a central bore,
a washer interposed between the head of the drift bolt and the lower face of the hub, said washer having a predetermined thickness, whereby the starwheel rests on an upper face of the drift bolt with a predetermined clearance with respect of the hub,
a bolt mounted in the bore, said bolt having a threaded portion protruding from the drift bolt and screwed into a hole provided in the wheel, thereby fastening the wheel to the hub.

The above and other objects and advantages of the invention will become apparent from the detailed description of preferred embodiments, considered in conjunction with the accompanying drawings.

DESCRIPTION OF PREFERRED EMBODIMENTS

Referring now to the figures, there is shown an article conveying device 1 for transferring containers, such as bottles for liquid beverages, from a loading point P1 to an unloading point P2. The conveying device 1 may be part of a container handling machine including other operational devices such as a molding unit, a filling unit and a capping unit. The conveying device 1 may be interposed between two successive operational devices in order to ensure transfer of the containers from one operational unit to the other.

Figure 2:
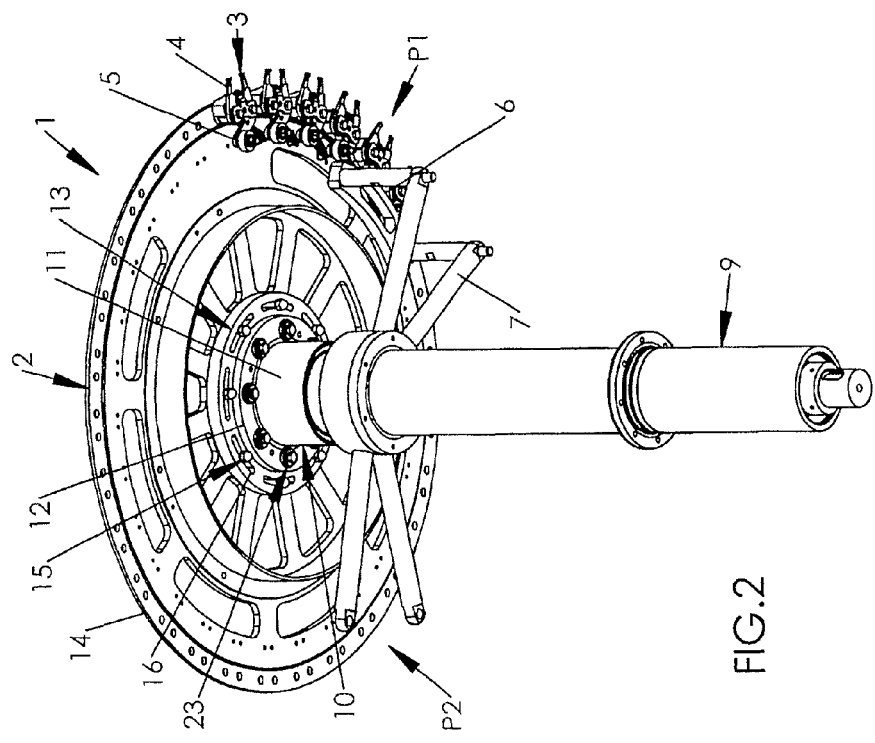
FIG. 2 is a bottom perspective view of a starwheel conveying device according to the invention.
Figure 1:
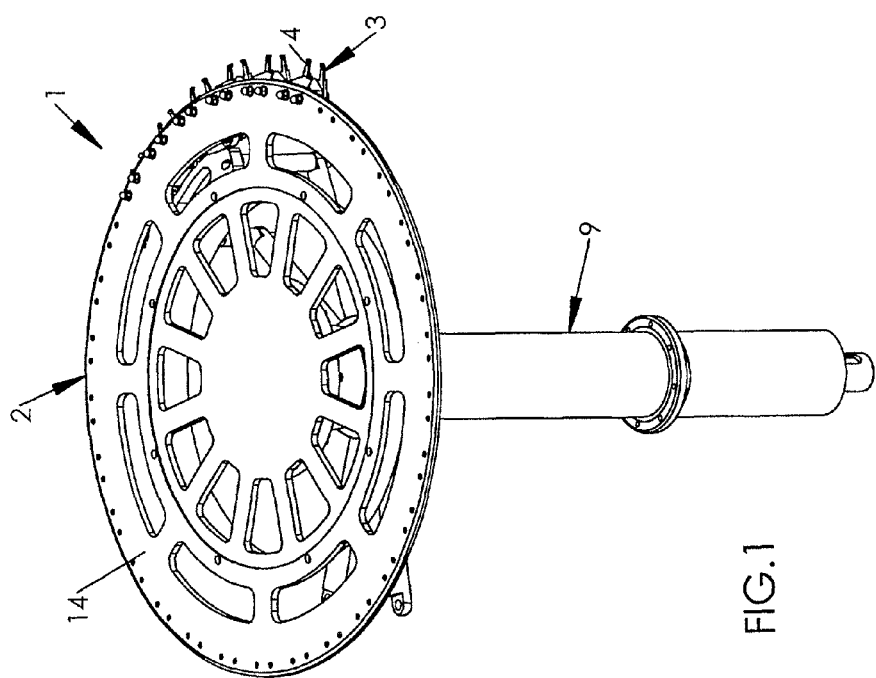
FIG. 1 is a top perspective view of a starwheel conveying device according to the invention.

The conveying device 1 comprises a star wheel 2 provided on its circumference with a plurality of gripping devices 3 each including a pair of fingers 4 pivotally mounted along the circular edge of the wheel 2. For the sake of clarity, only some of the gripping devices 3 are represented on FIG. 1 and FIG. 2. Each gripping device 3 includes a cam follower 5 fixed to one finger 4 and adapted, when reaching the loading point P1 or the unloading point P2, to run on a cam path 6 provided between the radial ends of supporting arms 7, thereby opening the fingers 4 and allowing one container to be held by the gripping device 3.

The conveying device 1 also comprises a vertical central rotary drive shaft 8, which is pivotally mounted in a coaxial cylinder 9 fixed to a machine frame, and a hub 10 coupling the wheel 2 to the drive shaft 8. The drive shaft 8 therefore forms the central rotation axis of the star wheel 2.

The hub 10 has a cylindrical body 11 which is rigidly fixed to the drive shaft 8 e.g. by means of a welding, and a circular peripheral flange 12 having a thickness T1 and radially protruding from or rigidly fixed to the body 11 at an upper end thereof.

Figure 3:
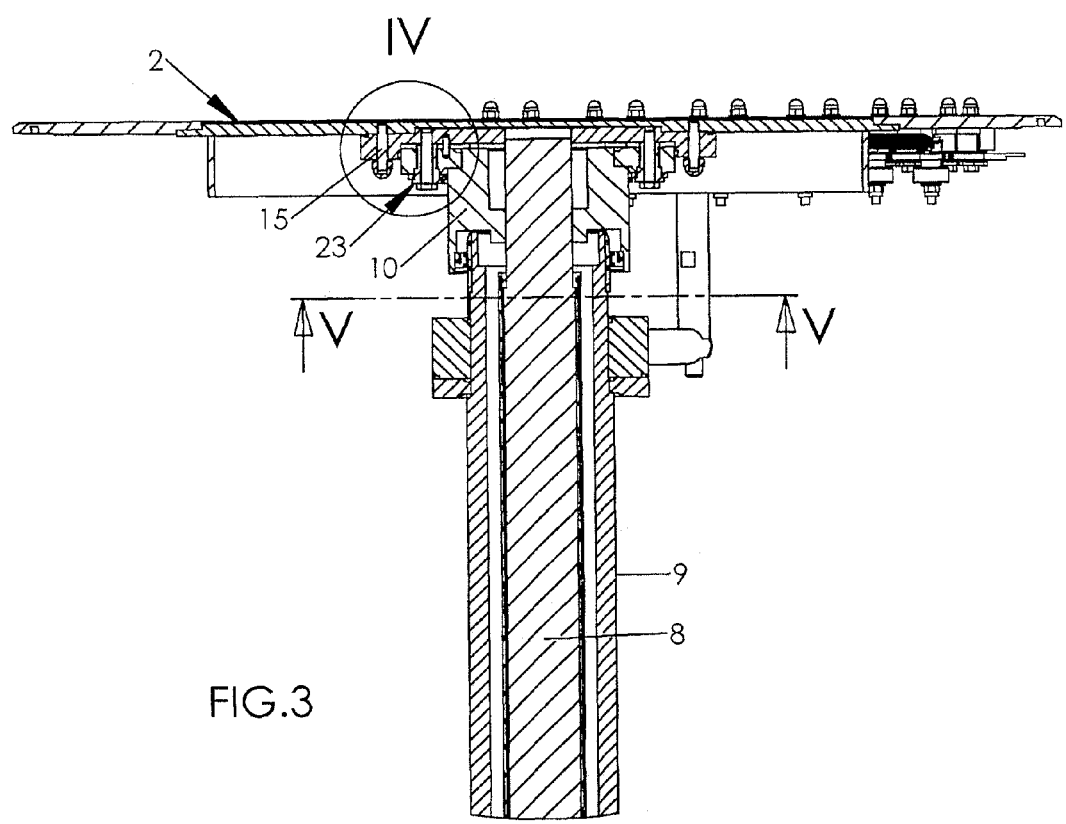
FIG. 3 is an elevation cut view of the starwheel conveying device of FIG. 1.
Figure 4:
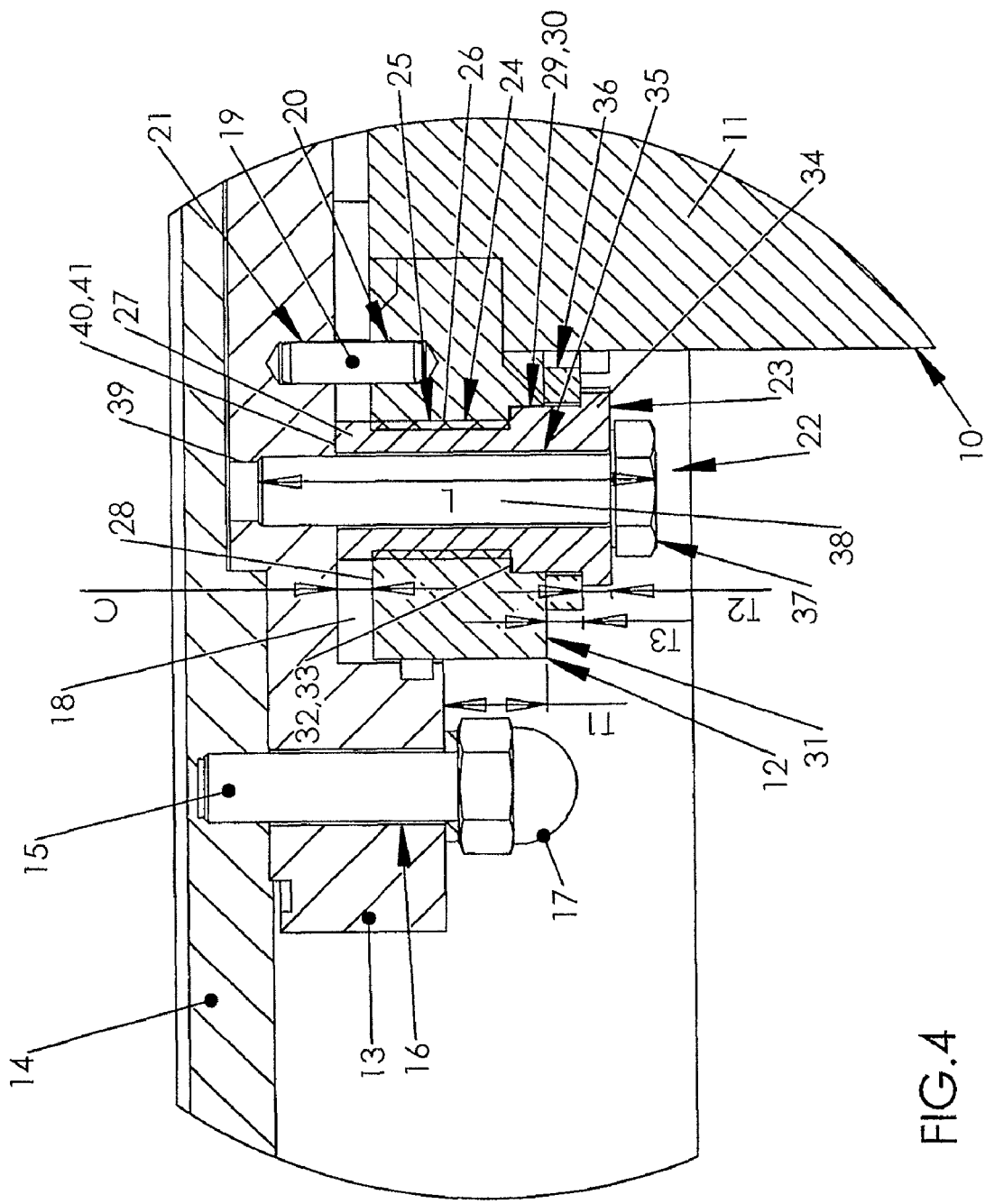
FIG. 4 is an enlarged cut view of the starwheel conveying device of FIG. 3, showing detail IV.
Figure 5:
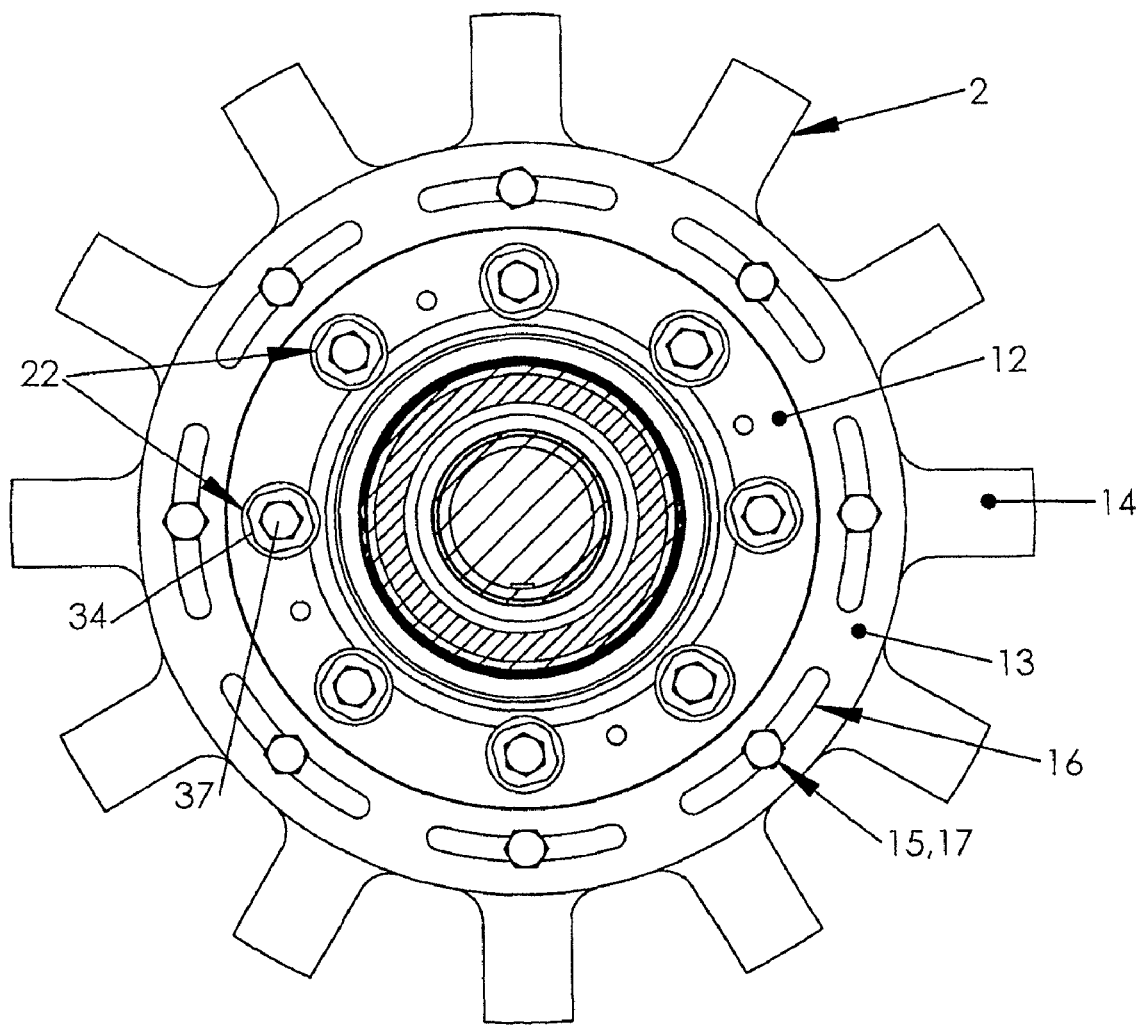
FIG. 5 is a bottom cut view of the starwheel conveying device of FIG. 3, taken along line V-V.

As depicted on FIG. 3 and FIG. 4, the wheel 2 has a central lower plate 13 fixed to the hub 10, and an upper plate 14 fixed to the lower plate 13 by means of a plurality of studs 15 screwed to the upper plate 14 and fitted into arc of circle shaped elongated openings 16 provided in the periphery of the lower plate 13. To each stud 15 a nut 17 is screwed to fasten the upper plate 14 to the lower plate 13 in a predetermined angular position with respect of the central rotation axis of the star wheel 2. Angular adjustment serves to precisely synchronize the opening and closing of the gripping devices 3 at the loading and unloading points P1, P2.

As depicted on FIG. 4, the lower plate 13 is provided with a central circular recess 18 where the peripheral flange 12 of the hub 10 is received. Diameters of the recess 18 and the peripheral flange 12 are substantially equal (with a clearance), in order for the hub 10 and wheel 2 to remain coaxial.

As depicted on FIG. 4, the conveying device 1 is provided with at least one dowel 19 fitted into two facing holes 20, 21 provided respectively in the hub 10 and the lower plate 13 of the wheel 2 for preventing angular displacement of the wheel 2 with respect of the hub 10.

The conveying device 1 further comprises adjustable fastening devices 22 for coupling the star wheel 2 to the hub 10 with vertical adjustment. Each fastening device 22 comprises a drift bolt 23 having an overall length L and including a body 24 having an upper threaded portion 25 screwed into a threaded hole 26 provided in the flange 12 of the hub 10. As depicted on FIG. 4, when completely screwed to the flange 12, the body 24 protrudes at 27 from an upper face 28 of the hub 10. The body 24 has a non-threaded lower portion 29 greater in diameter than the threaded portion 25 and received in a corresponding bore 30 formed in the flange 12 near a lower face 31 thereof. At the junction with the threaded portion 25, the non-threaded lower portion 29 forms a shoulder 32 which may, when the drift bolt 23 is completely screwed to the flange 12, come to abutment against a stop surface 33 formed at the junction between the threaded hole 26 and the bore 30. Non-threaded portion 29 of the body 24 protrudes from the lower face 31 of the flange 12, even when the drift bolt 23 is completely screwed thereto.

The drift bolt 23 further includes a nut-shaped head 34 having a thickness T2 and protruding radially from the non-threaded portion 29 of body 24 at a lower end thereof. Head 34 protrudes from the lower face 31 of the flange 12. The drift bolt 21 is provided with a central through bore 35.

Each fastening device 22 also comprises a washer 36 of predetermined thickness T3, interposed between the head 34 of the drift bolt 23 and the lower face 31 of the flange 12.

Each fastening device 20 further comprises a bolt 37 mounted in the through bore 35. The bolt 37 has a threaded portion 38 which protrudes from the drift bolt 23 at an upper end thereof and is screwed into a hole 39 provided in the lower plate 13 of the wheel 2.

When assembled, the star wheel 2 rests, via its lower plate 13, on an upper end face 40 of the drift bolt 23 with a predetermined clearance C between a lower face 41 of the lower plate 13 forming the bottom of the recess 18, and the upper face 28 of the flange 12. As washer 41 is tightened between the head 34 of the drift bolt 23 and the lower face 31 of the flange 12, clearance C calculates as follows:

$$C = L - T1 - T2 - T3 \quad (1)$$

As length L and thicknesses T1, T2 are fixed, the value of clearance C depends on the value of thickness T3. In other words, vertical position of the star wheel 2 depends upon the choice of the washer 36.

On the other hand, clearance C calculates as the difference between height H1 of the wheel 2 (to be set), measured to the lower face 41 of the lower plate 13, and height H2 (fixed) of the hub 10, measured to the upper face 28 thereof:

$$C = H1 - H2 \quad (2)$$

The wheel 2 and hub 10 are assembled as follows.

First of all, the vertical height H1 of the wheel 2 is precisely determined in function of the height of the loading and unloading points P1 and P2.

Clearance C is then calculated according to equation (2).

Thickness T3 of the washer 36 is then calculated through equation (1) as follows:

$$T3 = L - T1 - T2 - C$$

A washer 36 having a thickness equal to T3 is then picked up among an assortment of washers and joined to the drift bolt 23 to be mounted on the hub 10.

"Equal to" does not necessary means strictly identical. Of course, a certain clearance around thickness T3 may be tolerated, e.g. 1/10 mm, depending on the precision with which the wheel 2 is to be positioned vertically on the hub 10.

Each washer 36 is mounted on the non-threaded portion 29 of a drift bolt 21.

The drift bolts 21 are screwed into the flange 12 from its lower face 31 until the washers 36 are tightened between the heads 34 of the drift bolts 21 and the lower face 31 of the flange 12. In order to facilitate the screwing of each drift bolt 21, the head 34 is nut-shaped to permit wrench driving.

At this point, the protruding portions 27 of the drift bolts 23 have a length equal to the clearance C. The wheel 2 is then mounted onto the hub 10 with the flange 12 positioned in the recess 18 and the dowel 19 fitted into the two facing holes 20, 21, until the wheel 2 rests on the upper end faces 40 of the drift bolts 23.

The bolts 37 are then inserted in the bores 30 of the drift bolts 23 and screwed to the lower plate 13, thereby fastening the wheel 2 to the hub 10.

Modifying vertical position of the star wheel 2 is conducted as follows.

Clearance C and thickness T3 of the washers 36 are re-calculated as stated hereabove.

The bolts 37 are unscrewed from the wheel 2 and removed from the drift bolts 23. Without removing the star wheel 2, the drift bolts 23 are unscrewed from the flange 12 of the hub 10 and removed therefrom. The former washers 36 are replaced by the new ones picked up from the assortment and the drift-bolts 23 are screwed back into the hub 10. As soon as they reach the end of the threaded holes 26, the upper end faces 40 of the drift bolts 23 push the lower face 41 of the lower plate 13 and therefore elevate the star wheel 2 until the washers 36 are tightened between the heads 34 and the lower face 31 of the flange 12. The bolts 37 are then inserted back in the drift bolts 23 and screwed again to the lower plate 13.

Adjusting the vertical position of the wheel 2 with respect of the hub 10 is therefore quick, easy and simple. It is not necessary to remove the wheel 2. In addition, provided that proper washers 36 are affordable (they should be manufactured in consequence), vertical positioning of the wheel 2 is also precise.

Furthermore, it is possible to mount washers 36 of different thicknesses on the same hub 10 in order to slightly shift the wheel 2 with respect of the rotation axis, for example to compensate a lack of verticality thereof or to compensate a lack of horizontal alignment of the loading and unloading points P1, P2.

The invention claimed is:

1. An article conveying device comprising:
    a star wheel having a plurality of gripping devices mounted on the circumference thereof,
    a rotary drive shaft,
    a hub coupling the wheel to the drive shaft,
    said conveying device being characterized in that it comprises adjustable fastening devices for coupling the star wheel to the hub, each fastening device comprising:
    a drift bolt including:
    a body having a threaded portion screwed into a hole provided in the hub, said body protruding from an upper face of the hub,
    a head protruding from a lower face of the hub,
    a central bore,
    a washer interposed between the head of the drift bolt and the lower face of the hub, said washer having a predetermined thickness, whereby the starwheel rests on an upper face of the drift bolt with a predetermined clearance with respect of the hub,
    a bolt mounted in the bore, said bolt having a threaded portion protruding from the drift bolt and screwed into a hole provided in the wheel, thereby fastening the wheel to the hub.

2. The article conveying device of claim 1, wherein the head of the drift bolt is nut shaped for wrench driving.

3. The article conveying device of claim 1, further comprising a dowel fitted into two facing holes provided respectively in the hub and the wheel for preventing angular displacement of the wheel with respect of the hub.

4. The article conveying device of claim 1, wherein the star wheel has a lower plate fixed to the hub and an upper plate fixed to the lower plate.

5. The article conveying device of claim 4, further comprising:
    a plurality of studs screwed to the upper plate and fitted into arc of circle shaped elongated openings provided in the lower plate,
    a plurality of nuts screwed to each stud, thereby fastening the upper plate to the lower plate in a predetermined angular position.

* * * * *